United States Patent
Perriello (10) Patent No.: US 6,923,914 B2
(45) Date of Patent: *Aug. 2, 2005

(54) REMEDIATION OF METAL CONTAMINANTS WITH HYDROCARBON-UTILIZING BACTERIA

(75) Inventor: Felix Anthony Perriello, Norwood, MA (US)

(73) Assignee: Global Biosciences, Inc., North Attleborough, MA (US)

(*) Notice: Subject to any disclaimer, the term of this patent is extended or adjusted under 35 U.S.C. 154(b) by 97 days.

This patent is subject to a terminal disclaimer.

(21) Appl. No.: 10/205,816

(22) Filed: Jul. 26, 2002

(65) Prior Publication Data

US 2003/0062306 A1 Apr. 3, 2003

Related U.S. Application Data

(63) Continuation-in-part of application No. 09/878,656, filed on Jun. 11, 2001, now abandoned, which is a continuation-in-part of application No. 09/293,088, filed on Apr. 16, 1999, now Pat. No. 6,244,346, which is a continuation-in-part of application No. 09/275,320, filed on Mar. 24, 1999, now Pat. No. 6,245,235, which is a continuation-in-part of application No. 08/767,750, filed on Dec. 17, 1996, now Pat. No. 5,888,396.

(60) Provisional application No. 60/344,868, filed on Dec. 31, 2001, provisional application No. 60/308,487, filed on Jul. 27, 2001, provisional application No. 60/308,210, filed on Jul. 27, 2001, and provisional application No. 60/308,212, filed on Jul. 27, 2001.

(51) Int. Cl.$^7$ .................................................. C02F 3/00

(52) U.S. Cl. ..................... 210/610; 210/747; 210/912; 210/913; 210/914; 210/611; 435/262.5; 405/128.45; 405/128.7; 405/129.2

(58) Field of Search ................................. 210/610, 611, 210/747, 912, 913, 914; 435/262, 264, 262.5; 405/128.45, 128.5, 128.7, 128.75, 129.2, 129.25

(56) References Cited

U.S. PATENT DOCUMENTS 3,145,166 A   8/1964   Howe et al.
3,242,071 A   3/1966   Walker (Continued)

OTHER PUBLICATIONS

Zobnina et al., "Sorption of Heavy Metals by a Methane–Oxidizing Culture," *Biotekhnologia*, 1993, pp 55–56, No. 11–12 (Abstract).

(Continued)

*Primary Examiner*—Christopher Upton
(74) *Attorney, Agent, or Firm*—Pietragallo, Bosick & Gordon; Alan G. Towner (57) ABSTRACT

Methods and apparatus are disclosed for remediating metal contaminants using hydrocarbons which stimulate the growth of hydrocarbon-utilizing bacteria. The metal contaminants may include heavy metals such as arsenic, antimony, beryllium, cadmium, chromium, copper, lead, mercury, iron, manganese, magnesium, radium, nickel, selenium, silver, thallium and zinc. The hydrocarbon may include alkanes, alkenes, Aalkynes, poly(alkene)s, poly (alkyne)s, aromatic hydrocarbons, aromatic hydrocarbon polymers and aliphatic hydrocarbons. Butane is a particularly suitable hydrocarbon which stimulates the growth of butane-utilizing bacteria. Remediation may occur in-situ or ex-situ, and may occur under aerobic, anaerobic or dual aerobic/anaerobic conditions. Examples of applications include the remediation of heavy metals, the remediation of arsenic impacted surface water, groundwater and/or soil, the remediation of acid mine drainage, and the treatment of spent metal plating solutions.

87 Claims, 6 Drawing Sheets

U.S. PATENT DOCUMENTS

| | | | |
|---|---|---|---|
| 3,969,446 A | 7/1976 | Franklin, Jr. | |
| 4,033,763 A | 7/1977 | Markels, Jr. | |
| 4,111,808 A | 9/1978 | Fair | |
| 4,328,175 A | 5/1982 | Roeckel et al. | |
| 4,402,831 A | 9/1983 | Beardsmore et al. | |
| 4,454,077 A | 6/1984 | Litz | |
| 4,522,723 A | 6/1985 | Kauffman et al. | |
| 4,645,603 A | 2/1987 | Frankl | |
| 4,652,351 A | 3/1987 | Vaughan | |
| 4,652,352 A | 3/1987 | Saieva | |
| 4,695,378 A | 9/1987 | Ackman et al. | |
| RE32,562 E | 12/1987 | Litz | |
| 4,713,343 A | * 12/1987 | Wilson et al. | 210/611 |
| 4,737,289 A | 4/1988 | Castaldi et al. | |
| 4,789,478 A | 12/1988 | Revis et al. | |
| 4,790,940 A | 12/1988 | Castaldi et al. | |
| 4,956,080 A | 9/1990 | Josefik | |
| 5,047,126 A | 9/1991 | Greenberg | |
| 5,057,221 A | * 10/1991 | Bryant et al. | 210/610 |
| 5,061,406 A | 10/1991 | Cheng | |
| 5,062,956 A | 11/1991 | Lupton et al. | |
| 5,073,309 A | 12/1991 | Bousquet et al. | |
| 5,085,809 A | 2/1992 | Stirling | |
| 5,169,532 A | 12/1992 | Whitlock | |
| 5,259,960 A | 11/1993 | Beck | |
| 5,314,076 A | 5/1994 | La Place et al. | |
| 5,354,688 A | 10/1994 | Francis et al. | |
| 5,441,641 A | * 8/1995 | Vail et al. | 210/912 |
| 5,487,834 A | * 1/1996 | Carman et al. | 210/611 |
| 5,494,576 A | 2/1996 | Hoppe et al. | |
| 5,505,857 A | 4/1996 | Misra et al. | |
| 5,531,895 A | * 7/1996 | Alford et al. | 210/610 |
| 5,554,290 A | * 9/1996 | Suthersan | 210/610 |
| 5,632,715 A | 5/1997 | Harrington et al. | |
| 5,660,730 A | 8/1997 | Lucchese et al. | |
| 5,710,361 A | 1/1998 | Harrington et al. | |
| 5,733,067 A | 3/1998 | Hunt et al. | |
| 5,736,048 A | 4/1998 | Ibeanusi | |
| 5,803,664 A | * 9/1998 | Kawabata et al. | 210/747 |
| 5,833,855 A | 11/1998 | Saunders | |
| 5,888,396 A | 3/1999 | Perriello | |
| 5,895,832 A | 4/1999 | Eccles | |
| 5,916,491 A | 6/1999 | Hills | |
| 5,925,290 A | 7/1999 | Hills | |
| 5,948,375 A | 9/1999 | Stallknecht | |
| 5,968,359 A | * 10/1999 | Krahn et al. | 210/610 |
| 6,051,130 A | 4/2000 | Perriello | |
| 6,110,372 A | 8/2000 | Perriello | |
| 6,156,203 A | 12/2000 | Anthony | |
| 6,183,644 B1 | 2/2001 | Adams et al. | |
| 6,207,033 B1 | 3/2001 | Miller et al. | |
| 6,210,579 B1 | 4/2001 | Perriello | |
| 6,244,346 B1 | 6/2001 | Perriello | |
| 6,245,235 B1 | 6/2001 | Perriello | |
| 6,254,783 B1 | 7/2001 | Wurzburger et al. | |
| 6,319,328 B1 | 11/2001 | Greenberg et al. | |
| 6,322,700 B1 | 11/2001 | Suthersan | |
| 6,346,195 B1 | 2/2002 | Filson et al. | |
| 6,358,424 B1 | 3/2002 | Zaid et al. | |
| 6,361,694 B1 | 3/2002 | Trost | |
| 6,383,388 B1 | 5/2002 | Krauter et al. | |
| 6,391,209 B1 | 5/2002 | Belongia et al. | |
| 6,488,850 B2 | 12/2002 | Perriello | |
| 6,669,846 B2 | * 12/2003 | Perriello | 210/610 |
| 2001/0023847 A1 | 9/2001 | Perriello | |
| 2002/0066566 A1 | 6/2002 | Perriello | |
| 2002/0195389 A1 | 12/2002 | Perriello | |
| 2003/0034301 A1 | 2/2003 | Perriello | |
| 2003/0044966 A1 | 3/2003 | Perriello | |
| 2003/0062306 A1 | 4/2003 | Perriello | |
| 2003/0066322 A1 | 4/2003 | Perriello | |
| 2003/0084609 A1 | 5/2003 | Perriello et al. | |
| 2003/0136735 A1 | 7/2003 | Perriello | |
| 2003/0167686 A1 | 9/2003 | Perriello | |
| 2003/0201227 A1 | 10/2003 | Perriello | |

OTHER PUBLICATIONS

Jenkins et al., "Methanotrophic Bacteria and Facilitated Transport of Pollutants in Aquifer Material," *Appl. Environ. Microbiol.*, 1994, pp 3491–3498, vol. 60, No. 10 (Abstract).

Wilson et al., "Biological Treatment of Trichloroethylene and 1,1,1–Trichloroethane from Contaminated Air Streams", Proceedings of Petroleum Hydrocarbons and Organic Chemicals in Ground Water: Prevention, Detection and Restoration (The Westin Galleria, Houston, Nov. 9–11, 1988), v2, pp. 823–831, published in 1989.

* cited by examiner

REMEDIATION OF METAL CONTAMINANTS WITH HYDROCARBON-UTILIZING BACTERIA

CROSS-REFERENCE TO RELATED APPLICATIONS

This application is a continuation-in-part of U.S. patent application Ser. No. 09/878,656 filed Jun. 11, 2001 now abandoned, which is a continuation of U.S. patent application Ser. No. 09/293,088 filed on Apr. 16, 1999, now U.S. Pat. No. 6,244,346, which is a continuation-in-part of U.S. patent application Ser. No. 09/275,320 filed on Mar. 24, 1999, now U.S. Pat. No. 6,245,235, which is a continuation-in-part of U.S. patent application Ser. No. 08/767,750 filed on Dec. 17, 1996, now U.S. Pat. No. 5,888,396, which are incorporated herein by reference. This application also claims the benefit of U.S. Provisional Application Ser. Nos. 60/308,487, 60/308,210 and 60/308,212 filed Jul. 27, 2001, and U.S. Provisional Application Ser. No. 60/344,868 filed Dec. 31, 2001, which are incorporated herein by reference.

FIELD OF THE INVENTION

The present invention relates to the remediation of metal contaminants, and more particularly relates to the remediation of metal contaminants with hydrocarbon-utilizing bacteria.

BACKGROUND INFORMATION

Various types of metal contaminants are present in surface water, groundwater, soil, storage tanks, lagoons, industrial gaseous emissions and other sites, often as wastes or byproducts of industrial processes. Arsenic, antimony, beryllium, cadmium, chromium, copper, lead, mercury, iron, manganese, magnesium, radium, nickel, selenium, silver, thallium and zinc are considered to be priority pollutants by the U.S. Environmental Protection Agency (EPA).

Arsenic contamination in surface water, groundwater and soil represents a significant health hazard. Arsenic is used for hardening metals such as copper and lead and as a doping agent in the electronics industry. Arsenic salts are used to make herbicides, rodenticides and fireworks. Arsenic and arsenic compounds are toxic and can be carcinogenic. They are absorbed into the body through gastrointestinal ingestion or inhalation. For example, the trivalent inorganic compounds of arsenic, such as arsenic trichloride, arsenic trioxide and arsine, are highly toxic.

Arsenic-contaminated groundwater has conventionally been treated by groundwater pump and treat technologies including post precipitation, chemical oxidation, filtration, sedimentation, etc. With respect to the treatment of soils contaminated with arsenic, the following methods are currently employed: 1) land farming, where soil piles are watered and aerated; 2) bioreactors that involve the slurry treatment of soil and water in a closed vessel to which oxygen, nutrients and a carbohydrate cosubstrate such as molasses, corn syrup, or hydrolyzed starch are added; and 3) in-situ treatment where contaminated soils are chemically oxidized and/or stabilized using encasement methods.

Contamination of groundwater and surface water by acid mine drainage (AMD) and heavy metals is also a global problem. Disposal of materials such as mine tailing, waste rock and spent oil shale have created severe environmental problems. AMD is contaminated effluent that results from the oxidation of iron-sulfide minerals exposed to air and water. AMD is generated by chemical reactions and bacterial oxidation processes. Sulfide ores contain large quantities of pyrite, which is discarded in the tailings and produces sulfuric acid when exposed to water and oxygen. The ferrous iron produced is then oxidized to ferric ions, which become the dominant oxidizing agent of the exposed sulfide minerals. The reduced sulfur and iron compounds in the deposit provide an environment for *T. ferrooxidans* which oxidize iron, thiosulfate, sulfur and metallic sulfides to obtain energy for growth while using oxygen as the final electron acceptor and $CO_2$ as its sole source of carbon. This process generates an acidic pH.

AMD resulting from all types of metal mining operations is one of the most pressing environmental problems facing the mining and mineral industries. A significant portion of the AMD draining into rivers and streams is released from waste rock. Once the AMD process has begun, it is extremely difficult to reverse or stop.

Conventional remediation options for groundwater impacted by AMD include preventing the infiltration of contaminants, stabilizing the contaminants chemically, or removal and treatment of the contaminated groundwater. In addition, subaqueous disposal of mine tailings has been employed to avoid terrestrial AMD. However, severe environmental impacts result from subaqueous tailings disposal, including increased turbidity in the receiving waters, sedimentation, toxicity, contamination and fish kills.

Electrolytic plating solutions normally contain high concentrations of heavy metals like zinc, chromium, cadmium, nickel, selenium, copper, gold, silver and nickel. Electroless nickel plating solutions contain a nickel metal salt, such as sulfate, acetate, carbonate or chloride salt, pH adjustors, accelerators, stabilizers, buffers, and wetting agents. The electroless nickel solutions only have a limited useful life and eventually become depleted or spent. The disposal or treatment of spent electrolytic metal plating solutions poses significant challenges for the electroplating industry. The dissolved metal concentration must be below discharge thresholds in order to allow for the solution to be discharged as non-toxic waste directly to a municipal wastewater treatment facility. The spent solutions from the electrolytic and electroless plating processes pose a severe hazard to the environment, if disposed of improperly, and a high monetary cost, if disposed of properly.

A number of wastewater treatment processes have been developed to reduce the metal content in spent plating solutions to low levels prior to discharge. Many current methods involve the removal of dissolved metal from solution by chemical reduction. The spent electroless solution is first contacted with a reducing agent for sufficient time to cause the dissolved metal salt to undergo chemical reduction, resulting in the precipitation of the metal compounds out of the solution. Some methods include the dosing of electroless baths with caustic soda to precipitate the bulk of the heavy metal contaminants as insoluble hydrous oxides (metal hydroxides), pressing the sludge into a filter cake, drumming and disposal. Another waste treatment used for spent electroless plating solutions is the dosing of the solution at slightly alkaline pH with reducing agents. The reducing agents typically used to convert the dissolved metal salt into insoluble metal precipitates include sodium borohydride, sodium hydrosulfite and other chemicals. A further waste treatment method known for reducing the dissolved metal content of spent electroless baths to acceptable discharge levels involves organosulfur precipitation of the metal by dosing the spent solution at a pH of 5–8 with water-soluble precipitating agents.

The bioremediation of various pollutants with butane-utilizing bacteria is disclosed in U.S. Pat. Nos. 5,888,396, 6,051,130, 6,110,372, 6,156,203, 6,210,579, 6,245,235 and 6,244,346, each of which is incorporated herein by reference.

SUMMARY OF THE INVENTION

In accordance with the present invention, hydrocarbon-utilizing bacteria are used to remediate metal contaminants. The bacteria use hydrocarbons as a substrate under aerobic, anaerobic or dual aerobic/anaerobic conditions. In a preferred embodiment, the hydrocarbon comprises at least one alkane such as butane, methane, ethane and/or propane. Examples of applications include the remediation of heavy metals, the remediation of arsenic impacted surface water, groundwater and/or soil, the remediation of acid mine drainage, and the treatment of spent metal plating solutions.

An aspect of the present invention is to provide a method of remediating a metal contaminant. The method includes treating the metal contaminant with hydrocarbon-utilizing bacteria in the presence of a hydrocarbon.

Another aspect of the present invention is to provide a method of treating a metal-contaminated site. The method includes supplying a hydrocarbon substrate to the site to thereby remediate the metal contaminant.

A further aspect of the present invention is to provide a system for remediating a metal contaminant. The system includes means for treating the metal contaminant with hydrocarbon-utilizing bacteria in the presence of at least one hydrocarbon.

Another aspect of the present invention is to provide a remediation system for treating a metal contaminant comprising a source of hydrocarbon substrate and at least one injector in flow communication with the hydrocarbon substrate and the metal contaminant.

These and other aspects of the present invention will be more apparent from the following description.

DETAILED DESCRIPTION

The present invention uses hydrocarbon-utilizing bacteria to remediate metal contaminants. The metal contaminants may include one or more metals listed on the Periodic Table, such as arsenic, antimony, beryllium, cadmium, chromium, copper, lead, mercury, iron, manganese, magnesium, radium, nickel, selenium, silver, thallium and zinc, as well as compounds containing such metals. In one embodiment of the present invention, the concentrations of metal contaminants in groundwater are reduced to the EPA Maximum Contaminant Levels (MCLs) set forth in the National Primary Drinking Water Regulations shown in Table 1 below. These MCLs represent safe levels for drinking water that metal concentrations in groundwater should not exceed. In the case of arsenic, the EPA has recently lowered the MCL from 0.05 milligrams per liter (mg/l) to 0.01 mg/l due to the toxic and carcinogenic nature of this metal.

TABLE 1

| EPA Maximum Contaminant Levels | |
|---|---|
| Metal Contaminant | MCL (mg/l) |
| Arsenic | 0.01 |
| Antimony | 0.006 |
| Beryllium | 0.004 |
| Cadmium | 0.005 |
| Chromium | 0.1 |
| Copper | 1.3 (Action Level) |
| Lead | 0.015 (Action Level) |
| Mercury | 0.002 |
| Iron | 0.3 (Secondary MCL) |
| Manganese | 0.05 (Secondary MCL) |
| Selenium | 0.05 |
| Silver | 0.10 (Secondary MCL) |
| Thallium | 0.002 |
| Zinc | 5 (Secondary MCL) |

Metal contaminants may be present in various media, for example, in soil, groundwater, surface water, storage tanks, lagoons, industrial gaseous emissions, waste rock, soil piles, agricultural soils and fertilizers, aquatic systems, paints, polymers, herbicides, pesticides and spent auto fluids such as antifreeze and waste oil. Some examples of metal contaminants include acid mine drainage, metal plating solutions, arsenic-impacted groundwater, metallic salts used to control algae in lakes, weed control chemicals for lawns, pollution in river sediments and lakes, urban highway runoff, metal surface treatment waste, metal cutting and fabrication dust and junked auto parts. Metal contaminants may be present at many different industrial sites such as mining facilities, smelting operations, foundries, steel mills, metal processing and manufacturing facilities, process plants, production facilities for computer chips and semiconductors, and the like. Some types of metal contaminants may be radioactive, such as nuclear waste, armor plating production waste, munitions and ordnance, and hospital waste.

The present invention uses hydrocarbon-utilizing bacteria in the presence of at least one hydrocarbon substrate to remediate metal contaminants. The hydrocarbon may comprise one or more alkane, alkene, alkyne, poly(alkene), poly(alkyne), aromatic hydrocarbon, aromatic hydrocarbon polymer, or aliphatic hydrocarbon. In a preferred embodiment, the hydrocarbon comprises at least one alkane such as butane, methane, ethane and/or propane. For example, butane is a nontoxic and relatively low molecular weight organic compound that may serve as an electron donor under aerobic or anaerobic conditions. The high solubility of butane provides a large zone of influence and makes butane particularly suited to accelerate the transformation of aerobic conditions to anaerobic conditions. Under aerobic conditions, butane substrates stimulate the growth of butane-utilizing bacteria which may oxidize iron and other metals.

In a preferred embodiment, butane is the most prevalent compound of the hydrocarbon substrate on a weight percent basis, and typically comprises at least about 10 weight percent of the hydrocarbon substrate. The other constituents of the hydrocarbon substrate may include other alkanes or other types of hydrocarbons, and may also include inert gases. The hydrocarbon substrate preferably comprises at least about 50 weight percent butane. More preferably, the hydrocarbon substrate comprises at least about 90 weight percent butane. In a particular embodiment, the hydrocarbon substrate comprises at least about 99 weight percent n-butane. The butane may contain straight (n-butane) and/or branched chained compounds such as iso-butane.

Hydrocarbon-utilizing microorganisms used in accordance with the present invention are typically found naturally in the affected media. However, in some applications, it may be necessary to inoculate bacteria into the treatment zone. Suitable bacteria may include the following Groups (in addition to fungi, algae, protozoa, rotifers and all other aerobic and anaerobic microbial populations found in decaying materials):

Group 1: The Spirochetes
Group 2: Aerobic/Microaerophilic, motile, helical/vibroid, gram-negative bacteria
Group 3: Nonmotile (or rarely motile), gram-negative bacteria
Group 4: Gram-negative aerobic/microaerophilic rods and cocci
Group 5: Facultatively anaerobic gram-negative rods
Group 6: Gram-negative, anaerobic, straight, curved, and helical bacteria
Group 7: Dissimilatory sulfate- or sulfur-reducing bacteria
Group 8: Anaerobic gram-negative cocci
Group 10: Anoxygenic phototrophic bacteria
Group 11: Oxygenic phototrophic bacteria
Group 12: Aerobic chemolithotrophic bacteria and associated organisms
Group 13: Budding and/or appendaged bacteria
Group 14: Sheathed bacteria
Group 15: Nonphotosynthetic, nonfruiting gliding bacteria
Group 16: The fruiting, gliding bacteria and the Myxobacteria
Group 17: Gram-positive cocci
Group 18: Endospore-forming gram-positive rods and cocci
Group 19: Regular, nonsporing, gram-positive rods
Group 20: Irregular, nonsporing, gram-positive rods
Group 21: The mycobacteria
Groups 22–29: The actinomycetes
Group 22: Nocardioform actinomycetes
Group 23: Genera with multiocular sporangia
Group 24: Actinoplanetes
Group 25: Streptomycetes and related genera
Group 26: Maduromycetes
Group 27: Thermomonospora and related genera
Group 28: Thermoactinomycetes
Group 29: Genus *Glycomyces,* Genus *Kitasatospira* and Genus Saccharothrix
Group 30: The Mycoplasmas—cell wall-less bacteria
Group 31: The Methanogens
Group 32: Archaeal sulfate reducers
Group 33: Extremely halophilic, archaeobacteria (halobacteria)
Group 34: Cell wall-less archaeobacteria
Group 35: Extremely thermophilic and hyperthermophilic $S^0$-metabolizers.

In addition, suitable bacteria may include facultative and/or microaerophilic anaerobes, which are capable of surviving at low levels of oxygen. These bacteria do not require strict anaerobic conditions such as the obligate anaerobes. Acidophilic, alkaliphilic, anaerobe, anoxygenic, autotrophic, chemolithotrophic, chemoorganotroph, chemotroph, halophilic, methanogenic, neutrophilic, phototroph, saprophytic, thermoacidophilic and thermophilic bacteria may be used. Hydrocarbon and oxygen injection may encourage the growth of other microorganisms such as fungi, protozoa and algae that may be beneficial to the sulfur compound reducing process. The injected oxygen may be in the form of air (e.g., dry air with 20.9% oxygen), a gas stream with varying concentrations of oxygen, substantially pure oxygen or the like. The hydrocarbon and oxygen may be delivered continuously or intermittently, and may be delivered together or separately, e.g., through the same injectors or through different injectors.

Hydrocarbon-utilizing bacteria may oxide heavy metals through direct metabolism, sequential metabolism, reductive metabolism and/or cometabolism. Furthermore, the hydrocarbons may chemically oxidize or otherwise remediate the metals or metal compounds without the action of microorganisms.

In one embodiment of the invention, remediation of metals may occur both aerobically and anaerobically. For example, hydrocarbons such as butane may transform aerobic conditions to anaerobic conditions by initially accelerating the growth of aerobic hydrocarbon-utilizing microorganisms in the presence of oxygen, which produces carbon dioxide and transforms the aerobic conditions to anaerobic conditions. Under anaerobic conditions, *T. Ferrooxidans* activity may decrease or terminate, and anaerobic hydrocarbon-utilizing bacteria may flourish. Ultimately, the transformation from aerobic to anaerobic conditions may prevent or reduce heavy metal migration and curtail *T. Ferrooxidans* in general. In addition, the aerobic cycle may accelerate heavy metal precipitation out of solution, thereby inhibiting the migration of the metals through the subsurface, or facilitating the collection and removal of these metals using ex-situ techniques. Metal contaminants may be remediated by changing the subsurface microbial ecology of contaminated sites.

Remediation may be conducted either in-situ or ex-situ. In-situ equipment may include injection wells for the continuous or periodic delivery of the hydrocarbon substrate, oxygen and/or nutrients. For example, in-situ systems as described in U.S. Pat. Nos. 6,244,346 and 6,245,235 may be used to inject the hydrocarbon substrate and, optionally, oxygen to the remediation site.

Ex-situ equipment may include bioreactors, for example, as disclosed in U.S. Pat. Nos. 5,888,396 and 6,051,130, which are capable of treating air, soil or groundwater waste streams. The ex-situ bioreactor may be used in a batch-type process and/or in a continuous flow process. Ex-situ equipment may also include, for example, butane/air diffusers, precipitation lagoons with metal deposition membrane liners, anaerobic reduction chambers, and aerobic precipitation chambers.

Figure 1:
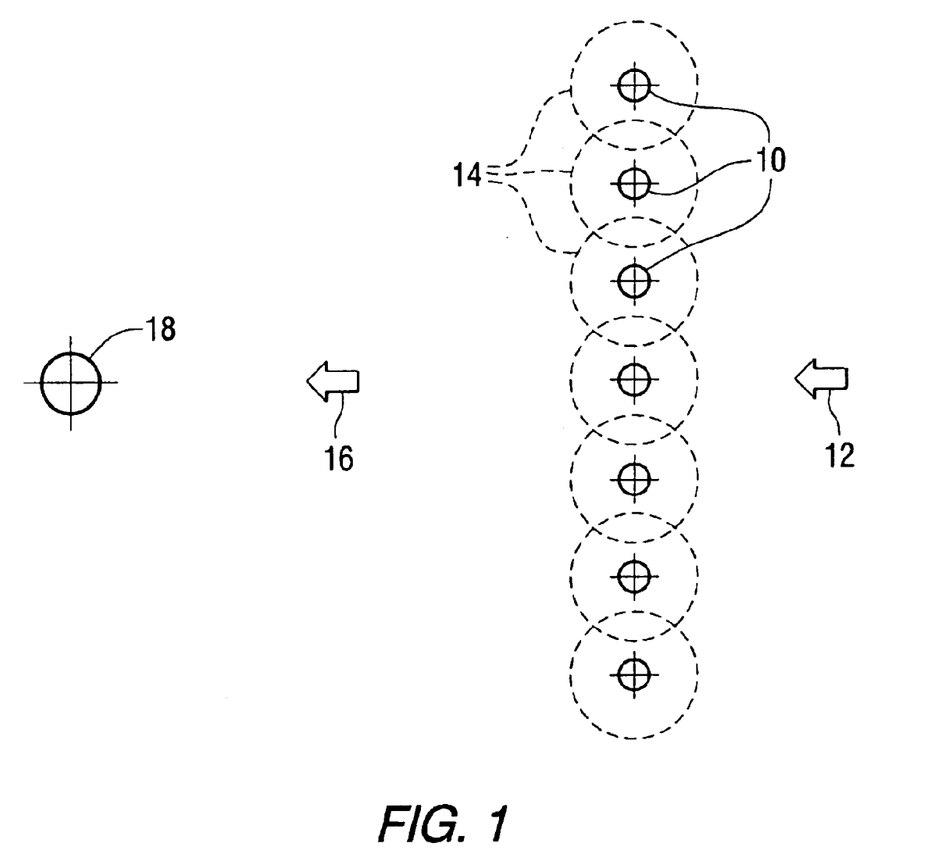
FIG. 1 is a schematic plan view of an in-situ hydrocarbon injection system for remediating metal-contaminated groundwater in accordance with an embodiment of the present invention.

FIG. 1 illustrates a system for in-situ treatment of arsenic-contaminated groundwater or other types of metal-contaminated groundwater in accordance with an embodiment of the present invention. Butane and air injection wells 10 are installed in-situ within a flow path of metal-contaminated groundwater 12 to create radii of influence 14 around the wells 10. Dissolved butane and oxygen thus form a barrier against arsenic migration. As the treatment continues, butane-utilizing bacteria produce the requisite enzymes to precipitate arsenic or other metal contaminants from the groundwater 12 onto aquifer solids. Clean groundwater 16 then flows toward a recovery well 18, e.g., a drinking water well.

Figure 2:
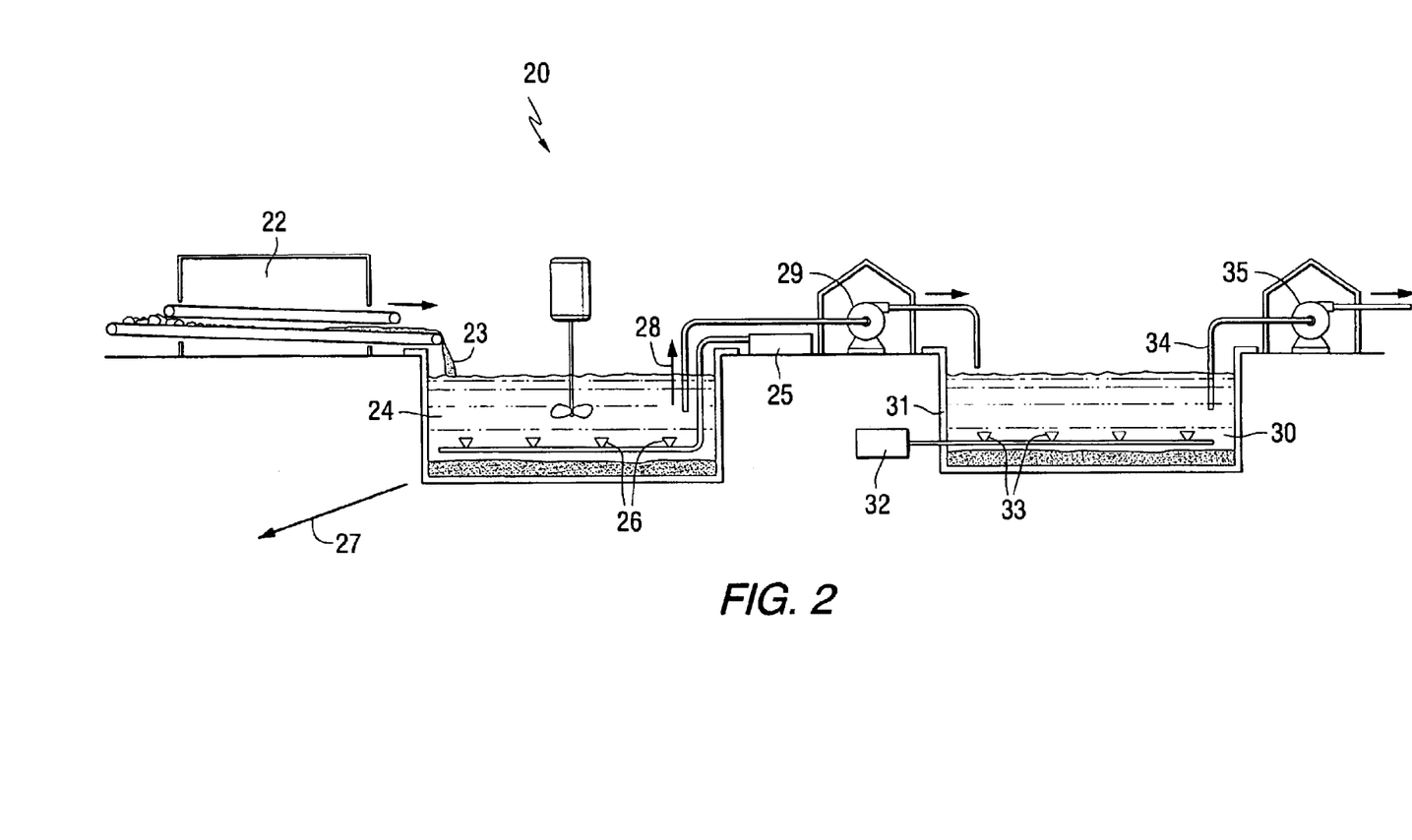
FIG. 2 is a schematic side view illustrating an ex-situ treatment system for metal-contaminated soil in accordance with an embodiment of the present invention.

FIG. 2 illustrates a system 20 for ex-situ treatment of metal-contaminated soil such as arsenic-containing soil in accordance with another embodiment of the present invention. The system 20 includes a rock crusher 22 where contaminated soil is pretreated or crushed. The crushed soil 23 is fed to a slurry bioreactor 24 which includes a hydrocarbon and oxygen supply 25 and diffusers 26. The hydrocarbon/oxygen supply 25 may comprise, for example, a cylinder containing a hydrocarbon such as butane and an air compressor, or any other suitable hydrocarbon/oxygen source. Alternatively, the supply 25 may only introduce a hydrocarbon into the bioreactor 24 if anaerobic conditions are desired. The hydrocarbon injected through the diffusers 26 stimulates the growth of hydrocarbon-utilizing bacteria in the bioreactor 24, which oxidize or otherwise separate the metal contaminant from the soil. In an alternative embodiment, the bioreactor 24 may be replaced with a washing tank where the metal contaminant is removed from the soil without the use of the hydrocarbon.

The clean soil 27 is removed from the bioreactor 24 and the metal-contaminated effluent 28 is pumped 29 to a precipitation lagoon 30 where further treatment by hydrocarbon-utilizing bacteria results in metal precipitation onto a membrane liner 31. The membrane 31 may be made of any suitable material, such as polyethylene, EPDM rubber, polyurethane or polypropylene. A hydrocarbon and oxygen supply 32 and diffusers 33 deliver, for example, butane and air to the precipitation lagoon 30. Although two different hydrocarbon supplies 25 and 32 are shown in FIG. 2, a single supply could be used. Clean water 34 is then pumped 35 from the precipitation lagoon 30 and the metal precipitates are eliminated, for example, by collection, separation, incineration, disposal and/or stabilization, e.g., with road construction materials such as concrete and/or asphalt.

Alternatively, metal-contaminated soil may be treated in heap piles utilizing leaching techniques. Hydrocarbon and air injection wells may be installed in the heap pile. Stimulated hydrocarbon-utilizing bacteria may precipitate the metal while water flushing over the heap collects the oxidized metal fraction and creates a solution effluent, which then can be treated separately, for example, in a precipitation lagoon as described above.

Figure 3:
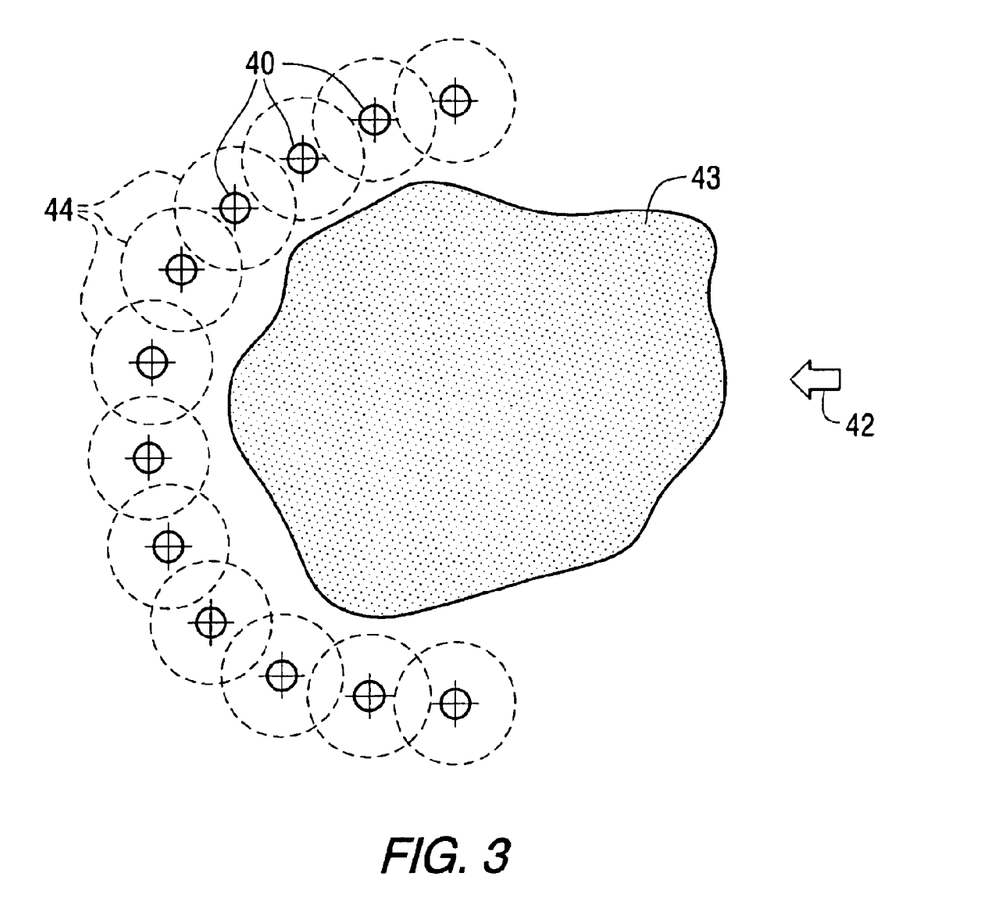
FIG. 3 is a schematic plan view of an in-situ hydrocarbon injection system for remediating acid mine drainage in accordance with an embodiment of the present invention.

FIG. 3 illustrates a system for treatment of a contaminated site, such as a heavy metal-contaminated site and/or an acid mine drainage site in accordance with a further embodiment of the invention. Butane (and/or other hydrocarbon substrates) and oxygen injection wells 40 are installed in-situ within a groundwater flow path 42 adjacent to a waste rock area 43 which may be above grade and/or below grade. For example, the waste rock 43, existing above and/or below ground, may result from metal mining operations and may be a source of AMD or heavy metal contamination. The wells 40 are installed in-situ and create radii of influence 44 which form a protective curtain or barrier to reduce or eliminate the flow of AMD or heavy metals. The injection wells 40 may operate aerobically, for example, by maintaining constant or intermittent air flow and constant or intermittent hydrocarbon flow. Alternately, the injection wells 40 may alternate between periodic hydrocarbon injection only and hydrocarbon/air injection to achieve alternating anaerobic and aerobic processes. With the transformation of the groundwater flow 42 to a substantially anaerobic state, and in the presence of an alternate electron acceptor such as carbon dioxide or nitrate, the hydrocarbon may serve as an electron donor and carbon source, thereby halting the AMD process.

Figure 4:
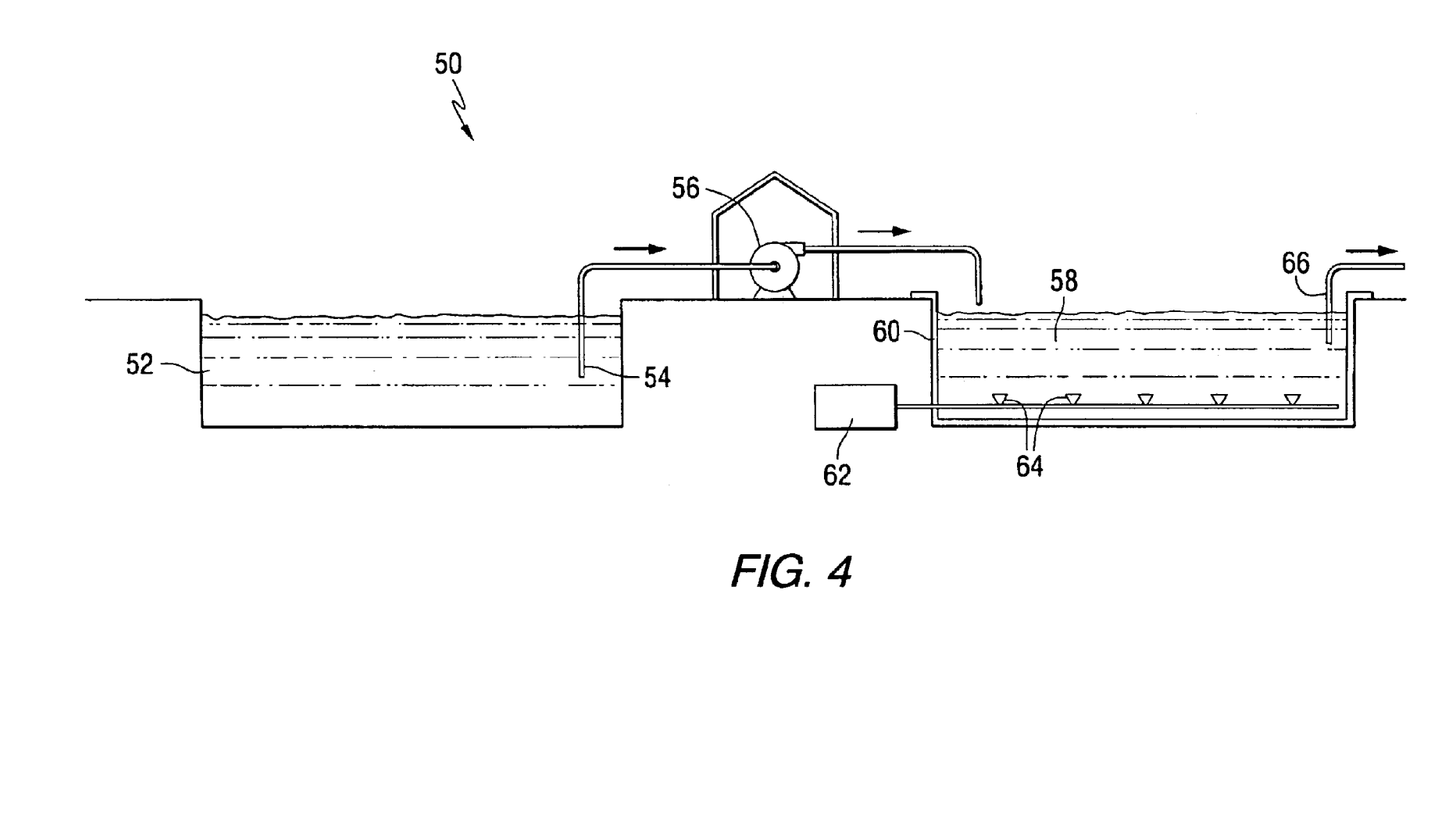
FIG. 4 is a schematic side view of an ex-situ treatment system employing hydrocarbon injection within a precipitation lagoon for the remediation of acid mine drainage in accordance with an embodiment of the present invention.

FIG. 4 illustrates an ex-situ system 50 for the treatment of lagoons or tanks contaminated with AMD or other heavy metal contaminants in accordance with an embodiment of the present invention. The ex-situ system 50 includes a lagoon 52 contaminated with acid mine drainage or other heavy metal contaminants. The contaminated fluid 54 is pumped 56 to a precipitation lagoon 58 lined with a membrane 60. A hydrocarbon and oxygen supply 62 and diffusers 64 inject the desired amounts of hydrocarbon and oxygen at the desired intervals in order to create anaerobic, aerobic or alternate anaerobic and aerobic conditions in the precipitation lagoon 58. For example, butane and air may be injected in order to stimulate the growth of aerobic butane-utilizing bacteria which accelerate heavy metal precipitation onto the membrane filter 60 installed in the precipitation lagoon 58. Clean water 66 is then pumped from the precipitation lagoon 58 while the metal contaminant is deposited on the membrane filter 60. The membrane 60 may be made of any suitable material, such as polyethylene, EPDM rubber, polyurethane or polypropylene.

Figure 5:
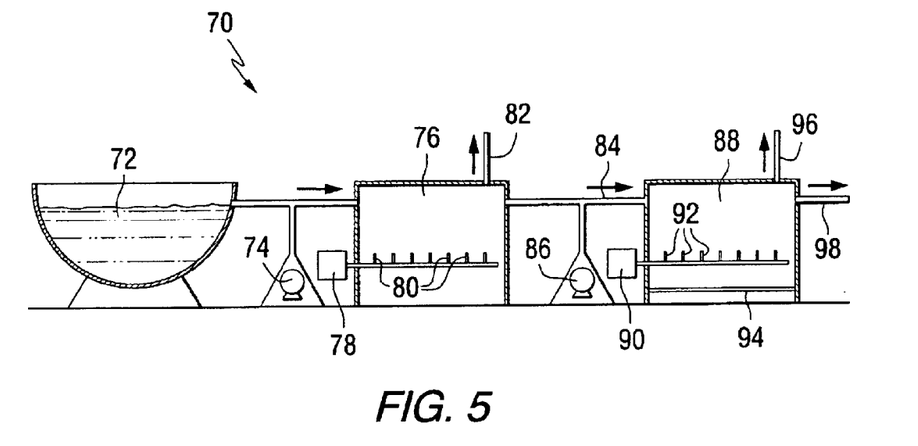
FIG. 5 is a schematic side view of an ex-situ treatment system for the remediation of spent metal plating solutions in accordance with an embodiment of the present invention.

FIG. 5 illustrates a system 70 for treating spent metal plating solutions in accordance with another embodiment of the invention. Spent metal plating solution 72 is pumped 74 to an anaerobic reduction chamber 76. A hydrocarbon supply 78 such as a butane cylinder and diffusers 80 inject the desired amount of hydrocarbon at the desired intervals into the reduction chamber 76. The chamber 76 is vented 82 to atmosphere, e.g., by a one-way valve. The solution 84 is then pumped 86 from the reduction chamber 76 to an aerobic precipitation chamber 88. A hydrocarbon and oxygen supply 90 and diffusers 92 inject the desired amounts of hydrocarbon and oxygen, such as butane and air, at the desired intervals into the aerobic precipitation chamber 88. A membrane liner 94 is provided at the bottom of the chamber 88, e.g., on a pull-out tray. The chamber 88 is vented 96 to atmosphere. Clean water 98 exits the chamber 88.

In accordance with the embodiment shown in FIG. 5, butane-utilizing bacteria or other hydrocarbon-utilizing bacteria in the reduction chamber 76 anaerobically pretreat the metal plating solution 72, e.g., using metabolic and cometabolic processes. Under anaerobic conditions, hydrocarbon-utilizing bacteria such as butane-utilizing bacteria may utilize a variety of alternate electron acceptors such as sulfate, nitrate or iron. The electroless plating solution 72 may be pretreated with buffers to maintain a pH between 4 and 8. Following treatment in the reduction chamber 76, the solution 84 undergoes microbial oxidation in the aerobic precipitation chamber 88. The alternate electron acceptors may be added, for example, to the butane/air mix injected into the precipitation chamber 88. Precipitated metals are deposited on the membrane liner 94 which may be incorporated into pull-out trays for subsequent removal. A low voltage current may be passed through a portion of the tray assembly to electrolyze and plate portions of the tray liners with the metal constituents to aid and expedite the metal recovery process.

The following example illustrates the treatment of a spent electroplating solution, and is not intended to limit the scope of the present invention.

EXAMPLE

A 4-liter sample of spent electroplating solution was collected from an industrial metal-plating facility. Prior to treatment with butane, one liter of the sample was submitted to a certified analytical laboratory for evaluation of the following parameters: pH; total cyanide; and total metals. The results of the characterization-sampling event are summarized in Table 2 below.

TABLE 2

| Parameter | Results |
| --- | --- |
| pH | 3.0 |
| Total cyanide | 0.08 mg/l |
| Antimony | <0.1 mg/l |
| Arsenic | <0.1 mg/l |
| Beryllium | 0.002 mg/l |
| Cadmium | <0.050 mg/l |
| Chromium | 1.34 mg/l |
| Copper | 0.16 mg/l |
| Lead | <0.04 mg/l |
| Mercury | <0.0005 mg/l |
| Nickel | 765 mg/l |
| Selenium | <0.2 mg/l |
| Silver | <0.20 mg/l |
| Thallium | <0.1 mg/l |
| Zinc | 3.10 mg/l | mg/l = milligrams per liter

The spent electroplating solution had a pH of 3.0. In addition, the concentrations of cyanide, beryllium, chromium, copper, nickel and zinc were detected above the laboratory detection limits. Ideally, prior to treatment with butane, the sample should have been adjusted with an alkaline buffer to raise the pH. However, the example was designed to demonstrate the principal of metals precipitation under conservative conditions. Therefore, the pH was not adjusted and since oxygen alone will partially oxidize metals, air was not pumped into the bioreactors designed for this study.

Figure 6:
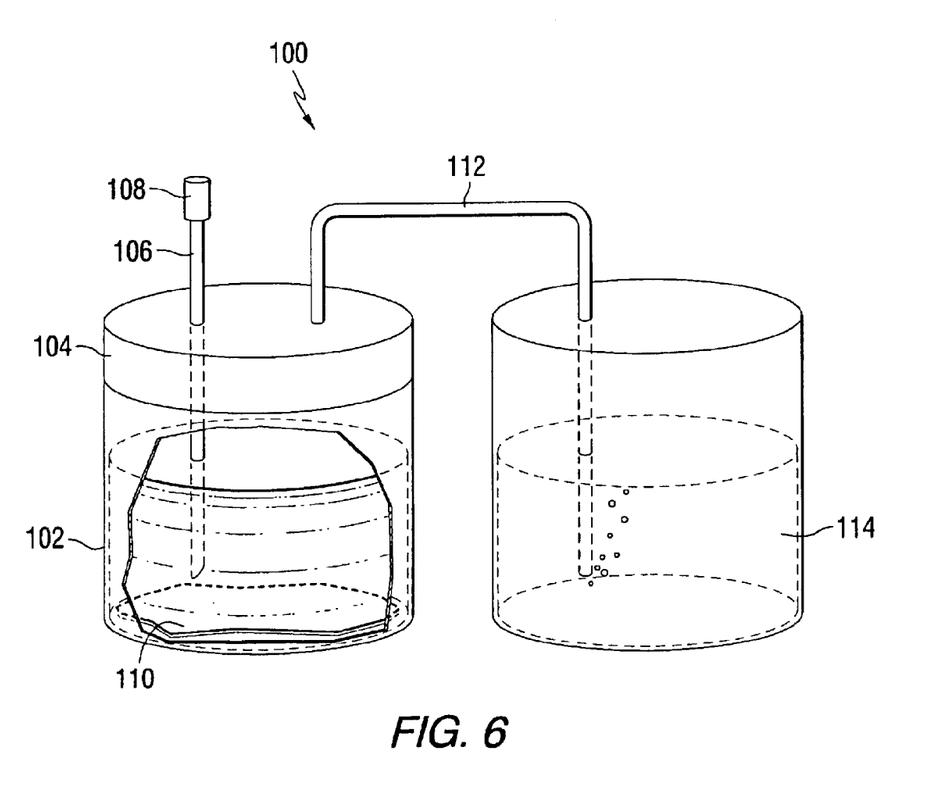
FIG. 6 illustrates an anaerobic bioreactor in accordance with an embodiment of the present invention.

The study demonstrated metal precipitation under both anaerobic and aerobic conditions. FIG. 6 illustrates an anaerobic bioreactor 100 used in the study. The reactor 100 included a container 102 having a lid 104, an injection tube 106 and a syringe port 108 to inject butane. A vent tube 112 was connected through the lid 104 to a water bath 114. Filter paper 110 was placed at the bottom of the bioreactor container 102. Three liters of spent electroplating solution underwent butane treatment in the anaerobic bioreactor 100 for 14 days.

Figure 7:
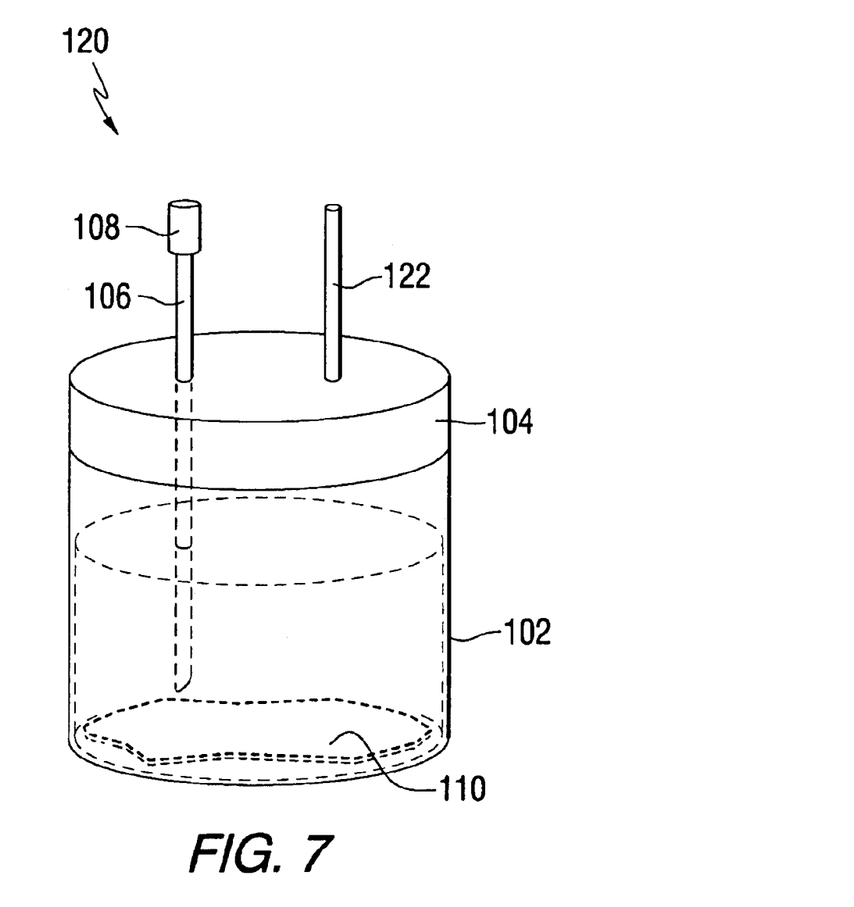
FIG. 7 illustrates an aerobic bioreactor in accordance with an embodiment of the present invention.

After 14 days, the vent tube 112 and water bath 114 shown in FIG. 6 were removed from the bioreactor 100. The resultant aerobic bioreactor 120 is illustrated in FIG. 7. Upon insertion of the vent tube 122, air exchange was permitted within the vessel 102, although to a limited degree since butane is heavier than air and displaces air in a semi-closed enviornment.

During the 28 days of the experiment, butane was injected according to the schedule shown in Table 3.

TABLE 3

| Day No. | Butane Gas (ml) | Condition |
| --- | --- | --- |
| 1 | 100 | Anaerobic |
| 2 | 200 | Anaerobic |
| 3 | — | Anaerobic |
| 4 | 100 | Anaerobic |
| 5 | — | Anaerobic |
| 6 | 400 | Anaerobic |
| 7 | 150 | Anaerobic |
| 8 | 100 | Anaerobic |
| 9 | 150 | Anaerobic |
| 10 | 100 | Anaerobic |
| 11 | 100 | Anaerobic |
| 12 | 100 | Anaerobic |
| 13 | 100 | Anaerobic |
| 14 | 100 | Anaerobic |
| 15 | 100 | Aerobic |
| 16 | 50 | Aerobic |
| 17 | 150 | Aerobic |
| 18 | 150 | Aerobic |
| 19 | 150 | Aerobic |
| 20 | 150 | Aerobic |
| 21 | — | Aerobic |
| 22 | 150 | Aerobic |
| 23 | 150 | Aerobic |
| 24 | — | Aerobic |
| 25 | — | Aerobic |
| 26 | — | Aerobic |
| 27 | 150 | Aerobic |
| 28 | 150 | Aerobic |

Following the 28-day experiment, the spent electroplating solution was decanted from the bioreactor. A change in color was immediately noticeable. The initial color of the solution was a deep bluish-green. After the 28-day period, the color was light green. The pH of the solution was tested and found to be the same, i.e., 3.0. A precipitate was noticeable on the filter paper. The filter paper was submitted to a certified analytical laboratory for metals analyses (only for those metals detected above the detection limit during the pre-characterization sampling event). The results are listed in Table 4.

TABLE 4

| Parameter | Results |
| --- | --- |
| pH | 3.0 |
| Total cyanide | <0.25 mg |
| Beryllium | <0.05 mg |
| Chromium | 3.5 mg |
| Copper | <2.5 mg |
| Nickel | 505 mg |
| Zinc | 8.5 mg |

As demonstrated by the results shown in Table 4, during the relatively short experiment the introduction of butane into the spent electroplating solution caused metals precipitation onto the filter paper located at the bottom of the bioreactor vessel.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of remediating a metal contaminant, the method comprising treating the metal contaminant with alkane-utilizing bacteria in the presence of an alkane comprising butane, ethane and/or propane.

2. The method of claim 1, wherein the alkane comprises butane.

3. The method of claim 2, wherein the butane is provided as a butane substrate comprising butane as the most prevalent compound of the substrate on a weight percentage basis.

4. The method of claim 2, wherein the butane is provided as a butane substrate comprising at least about 10 weight percent butane.

5. The method of claim 2, wherein the butane is provided as a butane substrate comprising at least about 50 weight percent butane.

6. The method of claim 2, wherein the butane is provided as a butane substrate comprising at least about 90 weight percent butane.

7. The method of claim 2, wherein the butane is provided as a butane substrate comprising at least about 99 weight percent n-butane.

8. The method of claim 1, wherein the at least one alkane comprises ethane.

9. The method of claim 1, wherein the at least one alkane comprises propane.

10. The method of claim 1, wherein the hydrocarbon is introduced to the hydrocarbon-utilizing bacteria intermittently.

11. The method of claim 1, wherein the hydrocarbon is introduced to the hydrocarbon-utilizing bacteria continuously.

12. The method of claim 1, wherein the metal contaminant comprises at least one heavy metal.

13. The method of claim 1, wherein the metal contaminant comprises arsenic, antimony, beryllium, cadmium, chromium, copper, lead, mercury, iron, manganese, magnesium, radium, nickel, selenium, silver, thallium and/or zinc.

14. The method of claim 1, wherein the metal contaminant comprises arsenic.

15. The method of claim 1, wherein the metal contaminant comprises selenium.

16. The method of claim 1, wherein the metal contaminant comprises iron.

17. The method of claim 1, wherein the metal contaminant comprise manganese.

18. The method of claim 1, wherein the metal contaminant comprises chromium.

19. The method of claim 1, wherein the metal contaminant comprises a radioactive metal.

20. The method of claim 1, wherein the metal contaminant is present in acid mine drainage.

21. The method of claim 1, wherein the metal contaminant is present in spent metal plating solution.

22. The method of claim 1, wherein the hydrocarbon-utilizing bacteria comprise aerobic bacteria.

23. The method of claim 22, further comprising providing oxygen to the hydrocarbon-utilizing bacteria.

24. The method of claim 23, wherein the oxygen is provided in the form of air.

25. The method of claim 23, wherein the oxygen is provided in the form of substantially pure oxygen.

26. The method of claim 23, wherein the oxygen is provided to the hydrocarbon-utilizing bacteria continuously.

27. The method of claim 23, wherein the oxygen is provided to the hydrocarbon-utilizing bacteria intermittently.

28. The method of claim 1, wherein the hydrocarbon-utilizing bacteria comprise anaerobic bacteria.

29. The method of claim 1, wherein the hydrocarbon-utilizing bacteria comprise facultative anaerobes and/or microaerophilic anaerobes.

30. The method of claim 1, wherein the hydrocarbon-utilizing bacteria comprise aerobic bacteria, anaerobic bacteria, facultative anaerobes and/or microaerophilic anaerobes.

31. The method of claim 1, wherein the hydrocarbon-utilizing bacteria comprise at least one microorganism selected from the group comprising acidophilic, alkaliphilic, anaerobe, anoxygenic, autotrophic, chemolithotrophic, chemoorganotroph, chemotroph, halophilic, methanogenic neutrophilic, phototroph, saprophytic, thermoacidophilic and/or thermophilic bacteria.

32. The method of claim 1, wherein the hydrocarbon-utilizing bacteria comprise at least one bacterium selected from the group consisting of *Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium* and *Cytophaga*.

33. The method of claim 1, wherein the hydrocarbon-utilizing bacteria comprise at least one bacterium selected from the group consisting of *putida, rubrisubalbicans, aeruginosa, paradoxus, asteroides, brasiliensis, restricta, globerula, indologenes, meningosepticum, acidovorans, delafieldii, rhodochrous, erythropolis, fascians, barkeri, esteroaromaticum, saperdae, varians, kristinae, caviae, maltophilia, thalpophilum, spiritivorum, putrefaciens B, myrsinacearum, michiganense, xylosoxydans, terrae, aquaticum B* and *johnsonae*.

34. The method of claim 1, wherein the hydrocarbon-utilizing bacteria further comprise at least one microorganism selected from the group consisting of fungi, algae, protozoa, rotifers and/or microbes found in decaying material.

35. The method of claim 1, wherein the metal contaminant is remediated by precipitation of the metal.

36. The method of claim 35, wherein the metal contaminant is precipitated on a membrane.

37. The method of claim 1, wherein the metal contaminant is remediated by changing the valence state of the metal contaminant.

38. The method of claim 1, wherein the metal contaminant is remediated by oxidation of the metal.

39. The method of claim 1, wherein the metal contaminant is remediated by changing a subsurface microbial ecology of a metal-contaminated site.

40. The method of claim 1, wherein the metal contaminant is present in a liquid.

41. The method of claim 40, wherein the liquid comprises water.

42. The method of claim 1, wherein the metal contaminant is treated in-situ at a contaminated site.

43. The method of claim 42, wherein the contaminated site comprises groundwater.

44. The method of claim 42, wherein the contaminated site comprises surface water.

45. The method of claim 1, wherein the metal contaminant is treated ex-situ.

46. The method of claim 1, wherein the metal contaminant is present in soil.

47. The method of claim 46, wherein the soil is mixed with liquid to form a slurry.

48. The method of claim 1, wherein the metal contaminant is treated in a precipitation lagoon.

49. The method of claim 1, wherein the metal is recovered by depositing the metal on a membrane.

50. The method of claim 1, wherein the metal contaminant is treated in a bioreactor.

51. The method of claim 1, wherein the metal contaminant is treated in a heap.

52. The method of claim 1, wherein the metal contaminant is initially treated in a reduction chamber and subsequently treated in a precipitation chamber.

53. A method of treating a metal-contaminated site, the method comprising supplying an alkane substrate to the contaminated site to thereby remediate the metal contaminant, wherein the alkane substrate comprises butane, ethane and/or propane.

54. The method of claim 53, wherein the alkane substrate comprises butane.

55. The method of claim 54, wherein the butane is provided as a butane substrate comprising butane as the most prevalent compound of the substrate on a weight percentage basis.

56. The method of claim 54, wherein the butane is provided as a butane substrate comprising at least about 10 weight percent butane.

57. The method of claim 54, wherein the butane is provided as a butane substrate comprising at least about 50 weight percent butane.

58. The method of claim 54, wherein the butane is provided as a butane substrate comprising at least about 90 weight percent butane.

59. The method of claim 54, wherein the butane is provided as a butane substrate comprising at least about 99 weight percent n-butane.

60. The method of claim 53, wherein the at least one alkane comprises ethane.

61. The method of claim 53, wherein the at least one alkane comprises propane.

62. The method of claim 53, wherein the hydrocarbon substrate is supplied to the contaminated site in a liquid form.

63. The method of claim 53, wherein the hydrocarbon substrate is supplied to the contaminated site in gaseous form.

64. The method of claim 53, wherein the hydrocarbon substrate is supplied to the contaminated site continuously.

65. The method of claim 53, wherein the hydrocarbon substrate is supplied to the contaminated site intermittently.

66. The method of claim 53, wherein the metal contaminant comprises at least one heavy metal.

67. The method of claim 66, wherein the at least one heavy metal comprises arsenic, antimony, beryllium, cadmium, chromium, copper, lead, mercury, iron, manganese, magnesium, radium, nickel, selenium, silver, thallium and/or zinc.

68. The method of claim 53, wherein the metal contaminant comprises arsenic.

69. The method of claim 53, wherein the metal contaminant comprises selenium.

70. The method of claim 53, wherein the metal contaminant comprises iron.

71. The method of claim 53, wherein the metal contaminant comprises manganese.

72. The method of claim 53, wherein the metal contaminant comprises chromium.

73. The method of claim 53, wherein the metal contaminant comprises a radioactive metal.

74. The method of claim 53, wherein the metal contaminant is present in acid mine drainage.

75. The method of claim 53, wherein the metal contaminant is present in a spent metal plating solution.

76. The method of claim 53, further comprising supplying oxygen to the contaminated site.

77. The method of claim 76, wherein the oxygen is supplied in the form of air.

78. The method of claim 76, wherein the oxygen is supplied in the form of substantially pure oxygen.

79. The method of claim 76, wherein the oxygen is supplied continuously.

80. The method of claim 76, wherein the oxygen is supplied intermittently.

81. The method of claim 53, wherein the contaminated site comprises surface water.

82. The method of claim 53, wherein the contaminated site comprises groundwater.

83. The method of claim 53, wherein the contaminated site comprises soil.

84. The method of claim 53, wherein the contaminated site is below a ground surface.

85. The method of claim 53, wherein the metal contaminant is treated in-situ.

86. The method of claim 53, wherein the metal contaminant is treated ex-situ.

87. The method of claim 53, wherein the metal contaminant is treated in a lagoon.

* * * * *

UNITED STATES PATENT AND TRADEMARK OFFICE
CERTIFICATE OF CORRECTION

PATENT NO. : 6,923,914 B2
APPLICATION NO. : 10/205816
DATED : August 2, 2005
INVENTOR(S) : Felix Anthony Perriello It is certified that error appears in the above-identified patent and that said Letters Patent is hereby corrected as shown below:

Cover Page
(73) Assignee
"Global Biosciences, Inc." should read "Global BioSciences, Inc."

Cross-Reference to Related Application
Column 1, Lines 8, 9
"patent application" should read "Patent Application"

Column 1, Line 9
"June 11, 2001" should read "June 11, 2001,"

Column 1, Line 10
"patent application" should read "Patent Application"

Column 1, Line 13
"patent application" should read "Patent Application"

Column 1, Line 15
"patent application" should read "Patent Application"

Detailed Description
Column 5, Line 65
"*Genus Glycomyces*" and "*Genus Kitasatospira*" should read "Genus Glycomyces" and "Genus Kitasatospira"

Claims
Claim 17,
"comprise" should read "comprises"

UNITED STATES PATENT AND TRADEMARK OFFICE
CERTIFICATE OF CORRECTION

PATENT NO. : 6,923,914 B2
APPLICATION NO. : 10/205816
DATED : August 2, 2005
INVENTOR(S) : Felix Anthony Perriello It is certified that error appears in the above-identified patent and that said Letters Patent is hereby corrected as shown below:

Claim 21,
"in spent" should read "in a spent"

Signed and Sealed this

Fifteenth Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,923,914 B2 | |
| APPLICATION NO. | : 10/205816 | |
| DATED | : August 2, 2005 | |
| INVENTOR(S) | : Felix Anthony Perriello | |

It is certified that error appears in the above-identified patent and that said Letters Patent is hereby corrected as shown below:

Cover Page
(73) Assignee
"Global Biosciences, Inc." should read "Global BioSciences, Inc."

Cross-Reference to Related Application
Column 1, Lines 8, 9
"patent application" should read "Patent Application"

Column 1, Line 9
"June 11, 2001" should read "June 11, 2001,"

Column 1, Line 10
"patent application" should read "Patent Application"

Column 1, Line 13
"patent application" should read "Patent Application"

Column 1, Line 15
"patent application" should read "Patent Application"

Detailed Description
Column 5, Line 65
"*Genus Glycomyces*" and "*Genus Kitasatospira*" should read "Genus Glycomyces" and "Genus Kitasatospira"

Claims
Column 11, Claim 17, Line 41,
"comprise" should read "comprises"

UNITED STATES PATENT AND TRADEMARK OFFICE
CERTIFICATE OF CORRECTION

PATENT NO. : 6,923,914 B2
APPLICATION NO. : 10/205816
DATED : August 2, 2005
INVENTOR(S) : Felix Anthony Perriello

It is certified that error appears in the above-identified patent and that said Letters Patent is hereby corrected as shown below:

Column 11, Claim 21, Line 49,
"in spent" should read "in a spent"

This certificate supersedes the Certificate of Correction issued September 15, 2009.

Signed and Sealed this

Sixth Day of October, 2009

David J. Kappos
*Director of the United States Patent and Trademark Office*